Nov. 10, 1964 — V. E. HENLEY — 3,156,601
TIRE BUILDING DRUM
Filed Dec. 19, 1961
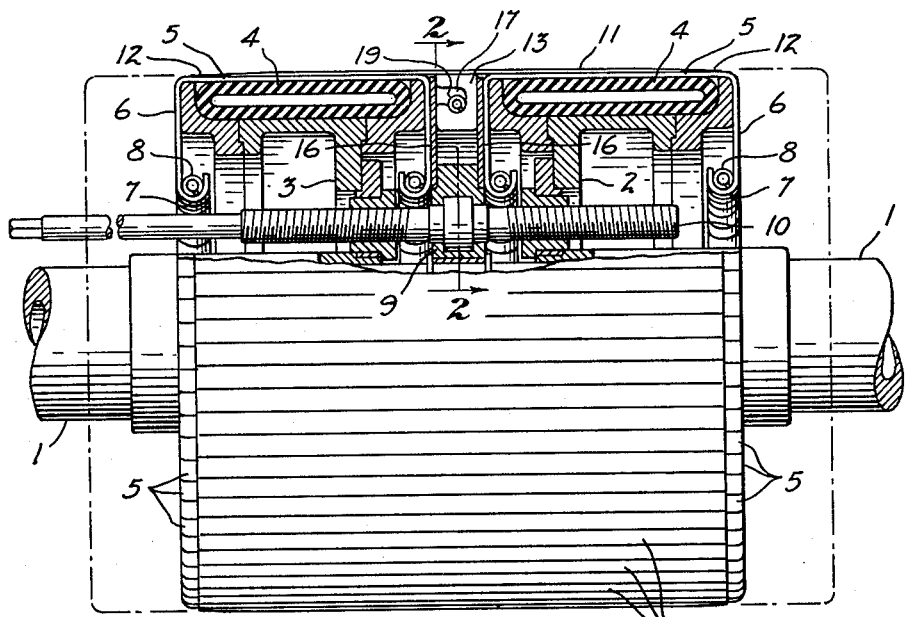
Fig. 1
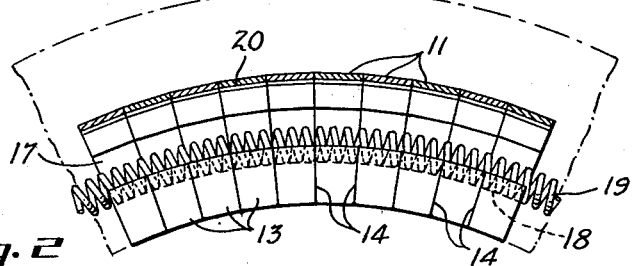
Fig. 2
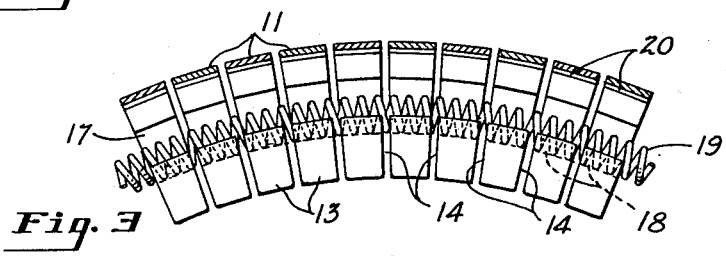
Fig. 3
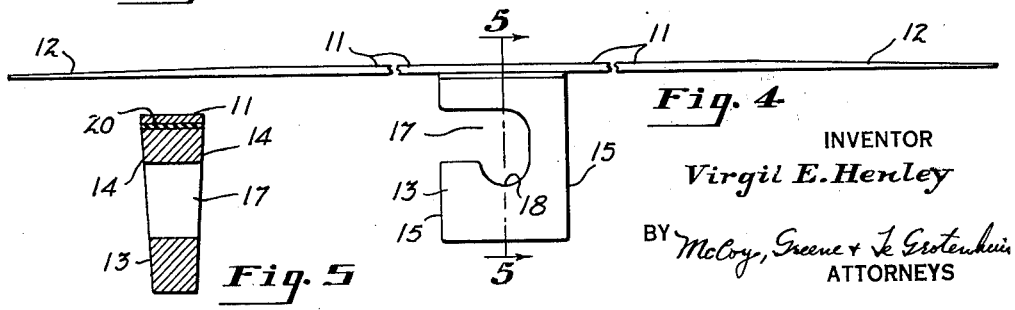
Fig. 4
Fig. 5
INVENTOR
Virgil E. Henley
BY McCoy, Greene & Te Grotenhuis
ATTORNEYS ns Nov. 10, 1964

3,156,601
TIRE BUILDING DRUM
Virgil E. Henley, Akron, Ohio, assignor to The General
Tire & Rubber Company, Akron, Ohio, a corporation of Ohio
Filed Dec. 19, 1961, Ser. No. 160,573
5 Claims. (Cl. 156—415)

This invention relates to expansible and extensible tire building drums of the type disclosed in the patent to Kraft, No. 2,614,952, granted October 21, 1952, which are provided with externally cylindrical expansible end sections that are axially adjustable and with an expansible band that telescopically receives the end sections and bridges the space between them. It is desirable that the bridging band serve not only to bridge the space between the two expansible drum sections, but also that the bridging band have sufficient rigidity to prevent unequal expansion of the drum.

Later improvements on the drum disclosed in the above Kraft patent are disclosed in patent to Kraft, No. 2,838,091, granted June 10, 1958, and patent to Henley, No. 2,979,110, granted April 11, 1961. These later patents show bridging bands that have greater rigidity because of the fact that they are composed of segments of relatively wide transversely arcuate form and because of the fact that the arcuate segments overlap circumferentially. The wide overlapping segments provide greater resistance to unequal expansion of opposite ends of the band but, because of the fact that the overlapping segments must slip circumferentially during expansion of the drum with respect to one another and with respect to the inner ply of a tire carcass band of rubber and fabric that has been placed on the drum while it was contracted to its smallest diameter, there is a tendency to cause some disarrangement of the cords of the innermost ply of rubberized fabric which contacts with the bridging band due to frictional resistance to slippage between the arcuate metal segments and the carcass band.

The present invention minimizes the slippage between the band segments and the tire carcass by providing a band composed of a large number of narrow flat segments that abut edge to edge when the drum is contracted and which separate slightly when the drum is fully expanded but which have the rigidity necessary to restrain unequal expansion of the drum sections because of the fact that the segments are in the form of relatively heavy gauge spring steel strips which strongly resist flexing about transverse axes and because of the fact that the segments are so supported between the end sections of the drum that they are positively held in positions parallel to the drum axis during expansion of the drum.

Objects of the present invention are to provide a rigid, expansible bridging band so constructed that there is a minimum of slippage between the band segments and the tire carcass, to provide a bridging band which can be quickly and easily assembled and which can be easily removed for repair and quickly reassembled.

With the above and other objects in view, reference should be had to the accompanying scale drawings which show a drum which is expansible from a minimum 12½" external diameter to 14" maximum external diameter and which is extensible from a minimum overall length of 13½" to a maximum overall length of 17½".

FIGURE 1 is a side elevation of the tire building drum above referred to (⅓ to 1 scale) with peripheral portions broken away and shown in longitudinal section;

FIG. 2 is a fragmentary transverse section (¾ to 1 scale) through a portion of the bridging band indicated by the line 2—2 in FIG. 1;

FIG. 3 is the same section as FIG. 2, showing the band expanded;

FIG. 4 is a side elevation (1 to 1 scale) of a bridging band segment that has been shortened by breaking away portions between the central positioning block and the ends thereof; and FIG. 5 is a section taken on the line indicated at 5—5 in FIG. 4.

In the accompanying drawing there is shown a drum shaft 1 which carries a tire building drum having axially spaced end sections 2 and 3 which are of identical construction having recessed peripheries which support inflatable tubes 4 which serve to expand the cylindrical faces of the drum, which are formed by narrow axially extending segments 5 which abut edge to edge when the drum is contracted to its minimum external diameter. The segments 5 have inwardly bent radially extending ends 6 which terminate in inwardly bent portions 7 which provide retaining seats for coiled endless garter springs 8 that exert a radial inward thrust on the segments 5 to yieldingly hold them against the peripheries of the drum sections. The portions 7 engage with rim portions of the sections 2 and 3 to limit the expansion of the drum.

A drum positioning hub 9 is fixed to the shaft 1 between the drum sections 2 and 3 which are supported for turning movements with the shaft and for simultaneous adjustment toward and away from the hub 9 by means of an axially extending screw 10 journaled in the hub 9 and having oppositely threaded end portions for simultaneously adjusting the drum sections toward or away from the hub 9.

Insofar as above described the tire building drum is in all respects similar to the drums shown in the patents above referred to.

The bridging band of the present invention is composed of spring steel segments 11 which are formed of relatively heavy gauge spring steel, preferably at least .060" in thickness. These segments are substantially flat and abut edge to edge as shown in FIGS. 1 and 2 when the drum is contracted to its minimum external diameter. The segments 11 are of a length to extend substantially the full length of the drum when the sections 2 and 3 are adjusted to their innermost positions. At their ends the segments 11 have tapered portions 12 which, as shown, extend inwardly from the ends about two inches and which gradually reduce the thickness of the segments to less than one-half the thickness of the central portion at the extreme ends. Midway between the ends of the segments 11 metal positioning blocks 13, preferably formed of an aluminum alloy, are attached to the interior faces of the segments 11. The blocks 13 have a circumferential thickness adjacent the inner faces of the segments substantially equal to the width of the segments and are provided with circumferentially spaced faces 14 which abut and taper toward the drum axis when the drum is contracted to its minimum diameter. The blocks 13 have axially spaced side faces 15 that are disposed perpendicular to the drum axis. The blocks 13 are all of the same axial width so that the side faces 15 may be positioned in parallel planes perpendicular to the drum axis. The blocks 13 have a radial length greater than the radial expansion of the drum from its minimum to its maximum external diameter and the bridging band is held in a position centered with respect to the sections 2 and 3 by means of annular guide plates or disks 16 rigidly attached to the hub 9. The annular guide plates 16 closely underlie the segments 11 when the drum is fully contracted and engage the faces 15 of the blocks during the entire expanding movement of the drum.

Each of the blocks 13 is provided with a slot 17 that opens laterally to one of its side faces 15 and has a semi-cylindrical depression radially inwardly of the opening to the face 15 that provides a seat for an endless garter spring 19. The blocks are positioned with their slots 17 in registry circumferentially so that the spring may be inserted laterally into the slots and placed into engagement with the seats 18. The guide plates 18 serve to positively hold the segments 11 in positions parallel to the drum axis, as well as to hold the bridging band in a position centered with respect to the end sections 2 and 3.

A yielding connection is preferably provided between each of the positioning blocks 13 and its segment 11. The yielding connection is provided by means of a thin layer of elastic rubber 20 interposed between the outer face of the block and the interior face of the segment and bonded to the segment and block. The flexible connection is provided by coating a thin strip of cured rubber about 1/32" in thickness with a suitable rubber to metal cement and bonding the rubber to the segment 11 and to the block 13.

The elastic connection between the block and segments allows slight relative movements between each block and its attached segment which tends to eliminate sharp bending of a segment which might cause a permanent deformation adjacent the point of attachment.

Access is readily had to the bridging band for replacement of a damaged unit by lifting outwardly on a unit and extending the spring 19 until the positioning block is beyond the annular guide plates 16. The damaged unit is then free to be removed from the band. This same procedure is used for complete assembly or removal of the bridging band.

It is to be understood that in accordance with the provisions of the patent statutes, variations and modifications of the specific devices herein shown and described may be made without departing from the spirit of the invention.

What I claim is:

1. In a tire building drum having a supporting shaft and two externally cylindrical expansible and contractible sections connected to turn in unison, means for expanding said sections and means for adjusting said sections axially toward or away from one another, the combination therewith of an expansible and contractible band bridging the space between said drum sections, telescopically receiving said sections and conforming to the curvature thereof, said band comprising interconnected segments in the form of straight narrow substantially flat spring steel strips disposed edge to edge and slidably engaging the external surfaces of said end sections, a metal positioning block attached to the interior face of each segment substantially midway between its ends, said blocks having inwardly converging circumferentially spaced faces that abut when the drum is contracted to its minimum diameter, said blocks being of the same axial width with the side faces perpendicular to the drum axis and of a radial length greater than the radial expansion of the drum, means for applying radial pressure to said bridging band consisting of elastic means attached to said blocks for maintaining a radial inward thrust thereon, and spaced annular plates attached to said shaft and having guide faces extending inwardly from their peripheral edges that are perpendicular to the drum axis and that engage the axially spaced faces of said blocks during the entire expanding movement of the drum to hold said segments parallel to the drum axis and against axial movements during expansion and contraction of the drum and that permit free radial movement of the individual blocks into and out of the space between the plates for removal or replacement.

2. A tire building drum as set forth in claim 1 in which each of the segment positioning blocks has a slot extending axially inwardly from a side face and a radially inwardly extending portion spaced inwardly from said side face, said axially and radially extending portions of said slots registering circumferentially to receive and seat an endless garter spring.

3. A tire building drum as set forth in claim 1 in which each segment positioning block is attached to its segment by means of a thin layer of elastic rubber interposed between the block and the segment and bonded to the block and segment.

4. A tire building drum as set forth in claim 1 in which the positioning blocks are composed of an aluminum alloy.

5. A tire building drum as set forth in claim 1 in which the spring steel segments of the bridging band are at least sixty thousandths of an inch in thickness in their central portions and have end portions that gradually taper to a thickness at the end of the segments less than one half that of their central portions.

References Cited in the file of this patent

UNITED STATES PATENTS

| | | |
|---|---|---|
| 2,367,831 | Manson | Jan. 23, 1945 |
| 2,614,952 | Kraft | Oct. 21, 1952 |
| 2,715,933 | Frazier | Aug. 23, 1955 |
| 2,838,091 | Kraft | June 10, 1958 |
| 2,979,110 | Henley | Apr. 11, 1961 |
| 3,077,917 | Appleby | Feb. 19, 1963 |